(12) United States Patent
Schlüsselberger et al.

(10) Patent No.: US 9,707,475 B2
(45) Date of Patent: Jul. 18, 2017

(54) DEVICE AND METHOD FOR SIMULATING ACCELERATIONS

(75) Inventors: Richard Schlüsselberger, Braunau am Inn (AT); Mark Wentink, Utrecht (NL)

(73) Assignee: Amst-Systemtechnik GmbH, Ranshofen (AT)

( * ) Notice: Subject to any disclaimer, the term of this patent is extended or adjusted under 35 U.S.C. 154(b) by 529 days.

(21) Appl. No.: 14/119,941

(22) PCT Filed: May 21, 2012

(86) PCT No.: PCT/EP2012/059367
§ 371 (c)(1),
(2), (4) Date: Aug. 20, 2014

(87) PCT Pub. No.: WO2012/160025
PCT Pub. Date: Nov. 29, 2012

(65) Prior Publication Data
US 2014/0087866 A1    Mar. 27, 2014

Related U.S. Application Data (60) Provisional application No. 61/489,065, filed on May 23, 2011, provisional application No. 61/535,523, filed on Sep. 16, 2011.

(30) Foreign Application Priority Data

May 23, 2011    (AT) .................................. A 739/2011
Sep. 16, 2011    (AT) ................................. A 1342/2011

(51) Int. Cl.
A63F 9/24        (2006.01)
A63F 13/98       (2014.01)
G09B 9/14        (2006.01)

(52) U.S. Cl.
CPC ................. *A63F 13/02* (2013.01); *G09B 9/14* (2013.01)

(58) Field of Classification Search
CPC ........ A63F 13/02; A63F 2300/69; G09B 9/10
See application file for complete search history.

(56) References Cited

U.S. PATENT DOCUMENTS

4,751,662 A    6/1988    Crosbie
5,021,982 A    6/1991    Crosbie et al.
(Continued)

*Primary Examiner* — Steve Rowland
(74) *Attorney, Agent, or Firm* — Laurence A. Greenberg; Werner H. Stemer; Ralph E. Locher (57) ABSTRACT

Accelerations are simulated for a person, on whom a main acceleration acts by rotation of the person at a distance about a main axis and by gravitational acceleration. The magnitude and the direction of the main acceleration is determined at least by the gravitational, tangential, and radial accelerations. The position of the person with respect to the direction of the main acceleration is determined by rotating and/or positioning the person about at least two secondary axes that pass through a center in the region of the person. If the magnitude and direction of the main acceleration are changed, primary faulty forces act on the person, which are compensated by rotating the person about the secondary axes, wherein secondary faulty forces act on the person due to rotation of the person about the secondary axes. The second faulty forces are reduced by rotating and positioning the person about three secondary axes.

12 Claims, 4 Drawing Sheets

(56) References Cited

U.S. PATENT DOCUMENTS

| | | | |
|---|---|---|---|
| 5,353,242 A | 10/1994 | Crosbie et al. | |
| 6,042,382 A * | 3/2000 | Halfhill | A63G 1/26 434/55 |
| 2003/0092496 A1 * | 5/2003 | Alsenz | A63G 1/24 472/59 |
| 2003/0219702 A1 * | 11/2003 | McClintic | G09B 9/20 434/45 |
| 2010/0216097 A1 * | 8/2010 | Romagnoli | G09B 9/04 434/35 |
| 2011/0045446 A1 * | 2/2011 | Glaser | G09B 9/12 434/59 |
| 2013/0183640 A1 * | 7/2013 | Comtois | G09B 9/28 434/59 |

* cited by examiner

DEVICE AND METHOD FOR SIMULATING ACCELERATIONS

BACKGROUND OF THE INVENTION

Field of the Invention

The invention relates to a method for simulating accelerations for a person, on whom a main acceleration acts which is essentially generated by rotating the person at a distance around a main axis and by gravitational acceleration, wherein the value and direction of the main acceleration are determined at least by the gravitational acceleration, the tangential acceleration and the radial acceleration, wherein the position of the person with respect to the direction of the main acceleration is determined essentially by a rotation of the person around at least two secondary axes, wherein the secondary axes run through a centre that lies in the region of the person, wherein primary faulty forces act on the person when there is a change in the value and the direction of the main acceleration, said faulty forces being at least partially compensated for by rotating the person around the secondary axes, and wherein secondary faulty forces act on the person due to rotating the person around the secondary axes.

Furthermore, the invention relates to a device for simulating accelerations for a person comprising: a first support element, which comprises a retention device for at least one person and is disposed around a first secondary axis in a rotatable manner with respect to a second support element; the second support element, which is disposed around a second secondary axis in a rotatable manner with respect to a third support element, wherein the first secondary axis and the second secondary axis are disposed essentially orthogonal to one another.

The device according to the invention and the method according to the invention are used amongst other things for the simulation of moving systems, such as for example aircraft, helicopters, vehicles, ships or similar. A virtual reality is simulated for a person located in a cabin or a hollow body by means of a plurality of artificially generated sensory perceptions. These sensory stimuli are on the one hand audiovisual stimuli, which are fed to the user via image reproduction systems and sound reproduction systems, and on the other hand accelerations or forces which act on the user are generated by the device and the method. The human brain interprets virtual motion states through the combination of audiovisual and physical sensory impressions. The more precisely the sensory perceptions correspond to the real sensory perceptions of such situations, the more realistic this interpretation becomes for the user. For this reason, it is very important to feed these signals to the user in a manner that is as close to reality as possible. Furthermore, the device and the method include the possibility of the motion simulation being influenced by the person. The person is thus able, for example, to control the motion of the simulated object in the virtual, simulated world.

The control signals of the person and any surrounding influences, such as for example wind, unevenness of the roadway, etc., are fed to a physical simulation model, which corresponds to a mathematical mapping of the real behaviour of the simulated object. It contains magnitudes such as mass inertias, resistances, etc. The accelerations or forces and their directions that are intended to be fed to the user in the virtual world are calculated with the aid of this model. This takes place by controlling various drives by means of a control unit.

Methods and devices for simulating accelerations for a person, in particular motion simulators, orientation trainers and methods for their operation, have long been known.

For example, one-arm centrifuges are known, wherein a person is rotated at a certain distance from the main axis along an essentially circular path. In addition to the gravitational acceleration, a radial acceleration acts on the person, which is essentially determined by the angular velocity and the distance between the person and the main rotational axis. With a constant angular velocity, the main acceleration acting on the person corresponds to the resultant acceleration from the gravitational acceleration and the radial acceleration. When there is a change in the angular velocity, a tangential acceleration also arises in addition to the radial acceleration. In the case of a non-uniform angular velocity, the main acceleration acting on the person is therefore composed of the vector addition of the radial acceleration, the tangential acceleration and the gravitational acceleration.

In order to feed the motion in the simulated object to the person in a manner close to reality, the person can be moved and positioned with at least two degrees of freedom. The technical solution for these degrees of freedom takes place via a cabin in which the person can be secured on a seat. The cabin is disposed rotatably on a roll ring. The roll ring is disposed rotatably on the main arm of the one-arm centrifuge. The two rotational axes, which are also referred to as secondary axes, are orthogonal to one another. According to the prior art, they comprise a point of intersection, which lies in the region of the person's head. The position of the person with respect to the main acceleration can be selected by means of the two degrees of rotational freedom.

In order, for example, to simulate a linear acceleration along the vertical body axis, the person is moved along an orbit around the main rotational axis.

The person's direction of vision runs tangential. The angular velocity is then increased, as a result of which the resultant main acceleration also increases. The person is positioned by means of the two secondary axes in such a way that the main acceleration vector has the same direction as the vertical body axis of the person. The effect is supported by optical sensory impressions which are fed to the person by image reproduction areas. When the angular velocity is increased, the radial acceleration increases, wherein direction of the resultant main acceleration is however also thus changed. Since this deviation of the direction of the main acceleration from the vertical body axis would be perceived by the person as a lateral force, the position of the person is also adapted by rotation about the secondary axes. The acceleration in the tangential direction by increasing the angular velocity can also be compensated for by changing the position of the person. The deviations and changes in the direction of the main acceleration which arise with a change in the angular velocity of the main arm, i.e. in the rotation about the main axis, are referred to as primary faulty forces. The latter are compensated for by rotation, positioning and/or positional change of the person.

A drawback with the prior art is that further, secondary faulty forces arise due to the compensation of the primary faulty forces. For example, an excessively rapid rotation of the person around to a secondary axis may be perceptible by the person. This sensory impression, however, is in contradiction with the visually represented images and the simulated motion sequence. This leads to misinterpretations by the brain and therefore not to a simulation close to reality.

A further drawback with the prior art is that the person, when rotated around the main axis, experiences a rotation about the body axis in addition to the translatory circular motion around the main axis. After a short adaptation phase by the human organ of equilibrium, however, this is no longer perceived. If the human organ of equilibrium or the person is additionally rotated around an axis that does not run parallel to the main axis, this generates spin changes and spin forces in the organ of equilibrium, which leads to further disturbances of the sensory perception. It is true that the sensory perceptions can be improved by visual impressions close to reality. In the case of a vestibulo-ocular reflex, in which eye flickering occurs, the visual stimuli can however no longer be perceived or can be perceived only to a very limited extent

BRIEF SUMMARY OF THE INVENTION

The problem of the invention is to provide a method and a device for simulating accelerations for a person which improve the quality of the simulation. Furthermore, it is the problem of the invention to reduce the secondary faulty forces. A further problem of the invention is to prevent misinterpretations by the human brain, in particular to improve the combination of optical and physical sensory impressions and to overcome the drawbacks of the prior art.

The problems according to the invention are solved by the fact that the secondary faulty forces are reduced by rotating and positioning the person around three secondary axes. Furthermore, the problems according to the invention are solved by the fact that the second support element is disposed rotatably around a third secondary axis on a motion device in order to compensate for or to reduce secondary faulty forces.

Further advantageous features are that the primary faulty forces are increased to reduce the secondary faulty forces, that in order to reduce the primary faulty forces and/or the secondary faulty forces in an equilibrium plane, the primary faulty forces and/or the secondary faulty forces are increased in a further equilibrium plane, that the angular velocities caused by secondary faulty forces lie below or in the region of the stimulation threshold of the person, that the angular accelerations caused by primary faulty forces and the angular accelerations caused by secondary faulty forces lie below or in the region of the stimulation threshold of the person, that the primary faulty forces, main acceleration faulty forces and/or Coriolis faulty forces and the secondary faulty forces include spin errors and/or rotational-inertial forces and/or that the angular acceleration and/or the gradient of the angular acceleration of a rotation of the person around the secondary axes is limited and/or attenuated in order to reduce the rotational-inertial forces.

According to the invention, provision can be made such that the person is rotated around the main axis and around the secondary axes, so that the angular acceleration of each semicircular channel in the respective equilibrium plane lies below the stimulation threshold of the person, that the stimulation threshold amounts to between $0.8°/s^2$ and $5°/s^2$, preferably to between $1°/s^2$ and $3°/s^2$, that in order to simulate a changing acceleration along the body axis of the person, the person is rotated at a constant first angular velocity around the main axis, at which the direction of the first main acceleration forms a first angle with respect to the direction of the gravitational acceleration, the person is then accelerated or decelerated to a second angular velocity, at which the direction of the second main acceleration forms a second angle with respect to the direction of the gravitational acceleration, and that the third equilibrium axis of the person is rotated into or is in a direction diverging from the tangential plane.

According to further features of the method, provision is made such that, to simulate a changing acceleration along a body axis of the person, the person is rotated at a constant first angular velocity around the main axis, at which the direction of the first main acceleration forms a first angle with respect to the direction of the gravitational acceleration, the person is then accelerated or decelerated to a second angular velocity, at which the direction of the second main acceleration forms a second angle with respect to the direction of the gravitational acceleration, that the third equilibrium axis of the person is rotated into or is in a direction diverging from the tangential plane and that the body axis of the person is rotated into an intermediate position between the direction of the first main acceleration and the direction of the second main acceleration and/or into the region of the first main acceleration or into the region of the second main acceleration and/or that the third equilibrium axis of the person with a constant angular velocity lies essentially in the radial plane.

According to further features of the method, provision is made such that the third equilibrium axis of the person with constant angular velocity lies essentially in a plane between the tangential plane and the radial plane, that the position of the third equilibrium axis of the person between the tangential plane and the radial plane is controlled or actively regulated by rotation of the person around three secondary axes, that the position of the body axis of the person between the tangential plane and the radial plane is controlled or actively regulated by rotation of the person around three secondary axes and/or that the rotation of the body axes and the equilibrium axes is changed or positioned by changing the position of the person around the secondary axes.

Furthermore, the invention is characterised in that the second secondary axis and the third secondary axis are disposed essentially orthogonal to one another, that at least one control unit is provided for the control and/or active regulation of the drives for moving the support elements and the motion device, and/or that the motion of the drives of the support elements around the secondary axes is controlled and/or actively regulated by the control unit, and that the motion lies below or in the region of the stimulation threshold of the person. Further advantageous features are that a motion of the drives of the secondary axes is controlled by the control unit, wherein the angular accelerations of the motion lie below the stimulation threshold of the person, that the device is equipped for performing the method according to the invention and/or that the motion device is constituted as a one-arm centrifuge, as a centrifuge with a traversable carriage, as a centrifuge with a traversable heave carriage, as a two-arm centrifuge with a traversable carriage on both sides, as a two-arm centrifuge with a traversable heave carriage on both sides, or as a robot arm with at least one rotational and/or translatory degree of freedom.

In order to improve the clarity, several basic terms are defined below:

A human being has two organs of equilibrium which are disposed in the region of the head. Each organ of equilibrium comprises three semicircular channels, in which the relative velocities of a viscous liquid can be detected by the sensory cells. The three semicircular channels of each organ of equilibrium lie essentially in three equilibrium planes. The first equilibrium plane, the second equilibrium plane and the third equilibrium plane are essentially orthogonal to one another and are disposed so that they can detect in pairs movements around the equilibrium axes of the person. The first equilibrium axis runs essentially along the subjective vertical axis of the person, the second equilibrium axis corresponds essentially to a line running parallel to the connecting line between the person's two ears or two eyes and the third equilibrium axis corresponds essentially to a line running parallel to the direction of vision with an unmoved view orientated straight ahead. The three equilibrium axes are essentially orthogonal to one another. The first equilibrium axis corresponds, for example, to the yaw axis, the second equilibrium axis to the pitch axis and the third to the roll axis. The three axes intersect in the region of the person's head, preferably in the plane of symmetry of the body, in the region between the person's ears and in the region of the latter's heart.

Furthermore, acceleration sensors for detecting linear accelerations are provided in the human organ of equilibrium. One of these acceleration sensors detects vertical accelerations, the two others detect horizontal accelerations.

The human organ of equilibrium perceives changes in accelerations, as well as changes in position and the position of the body with extreme accuracy. However, there are certain stimulation thresholds below which accelerations and changes in position are not perceived. These stimulation thresholds depend on the one hand on person-related sensitivities, and on the other hand they can be influenced by surrounding influences, such as for example visual stimuli. If the person is subjected, for example, to great stress and clear visual stimuli, such as for example the display of a horizon, the stimulation threshold lies much higher than in still surroundings without visual stimuli.

Furthermore, the stimulation threshold is not at the same height for all motion or acceleration sequences. Thus, for example, incorrect positions of a person are perceived with a lesser intensity in the second equilibrium plane than incorrect positions of the person in the third equilibrium plane.

The time factor also plays a role in the determination of the stimulation threshold. The organ of equilibrium thus adapts to a constant moderate basic acceleration that deviates from the gravitational acceleration and, after an adaptation phase of around twenty seconds to a minute, is not perceived or is perceived as only slightly raised.

For example, the stimulation threshold for an average person lies at approx. one degree per second squared, i.e. $1°/s^2$. For more resistant persons, or due to the influence of the subjective perception, the stimulation threshold can amount to up to $2°/s^2$ or $3°/s^2$. In extreme cases, the stimulation threshold can even amount to $5°/s^2$, that is to say that the person does not perceive the motion as such until at an angular acceleration of $5°/s^2$. The stimulation threshold of the angular acceleration per semicircular channel can accordingly amount to below $1°/s^2$ up to $5°/s^2$. In particular, these values apply to angular accelerations of the organs of equilibrium, to angular accelerations around a normal vector of an equilibrium plane which lies in the region of the organ of equilibrium, to angular accelerations of the semicircular channels due to spin errors and/or to angular accelerations due to rotations of the person around the centre that lies in the region of the person's head. Faulty forces that lie below the stimulation threshold of the person are therefore faulty forces that exert on the organ of equilibrium a rotational acceleration that lies below the stimulation threshold of the person.

The positioning of the person takes place via secondary axes. According to the invention, at least two, preferably three, secondary axes are provided. The secondary axes correspond essentially to the axes around which the retention device for the person is rotatably disposed. They run through a centre which is located at a distance from the main axis in the region of the person.

The retention device, to which the person is fastened, is rigidly connected to a first support element. The first support element is disposed rotatably around a first secondary axis on a second support element. The second support element is in turn disposed rotatably around a second secondary axis on a third support element, wherein the first and the second secondary axis are essentially orthogonal to one another. The third support element is provided rotatably around a third secondary axis on the motion device. The second secondary axis and the third secondary axis are also essentially orthogonal to one another. A device used to generate the main acceleration, i.e. to move the person around of the main axis, is referred to as a motion device. It can be constituted for example as a one-arm centrifuge, a multi-arm centrifuge, a two-arm centrifuge with a traversable carriage etc.

The rotation of the person around the secondary axes takes place by means of drives of the support elements. The drives enable the rotations around the secondary axes and are controlled and/or actively regulated by a control unit. This rotation of the motion device around the main axis by means of the main drive can also be controlled and/or actively regulated by the control unit.

The motions around the secondary axes and the main axis are preferably driven by drives, controlled and/or actively regulated. The main acceleration has a value and a direction, the magnitude of the acceleration being denoted as the value.

The rotational axes enable a rotation of the person around at least two, preferably three, rotational axes and thus comprise two or three degrees of rotational freedom. These axes can coincide with the equilibrium axes of the person. In some cases, however, it may also be desired that these axes do not coincide with the equilibrium axes of the person.

The term faulty force of the primary and of the secondary faulty forces relates not only to forces, but also to spin inertias, accelerations, rotational accelerations, linear accelerations, angular accelerations etc. In principle, these misperceptions are faulty forces which act on the sensory cells of the human organ of equilibrium and are therefore referred to as faulty forces to improve the clarity.

A plane in the region of the person in which the main axis lies is defined as a radial plane. A plane in the region of the person, in which the tangent of the orbit of the person around the main axis and a straight line parallel to the main axis lie, is defined as a tangential plane. The tangential plane and the radial plane are therefore roughly orthogonal to one another and have an intersecting straight line which runs parallel to the main axis and in the region of the person.

An arbitrary straight line, which runs through the person's body and is disposed stationary relative to the person, is defined as a body axis of the person. The equilibrium axes of the person are for example body axes.

The position of the person and the position of the person with respect to the direction of the main acceleration are defined with respect to a co-rotating coordinate system.

BRIEF DESCRIPTION OF THE SEVERAL VIEWS OF THE DRAWING

The method according to the invention and the device according to the invention are further described below with the aid of the figures.

DESCRIPTION OF THE INVENTION

In order to simplify the representation, the represented vectors of the accelerations correspond to the acceleration forces acting on the person. The orientation of the acceleration force is opposite to the corresponding acceleration. The acceleration vectors thus correspond to the opposing acceleration forces brought about by the accelerations.

Figure 1:
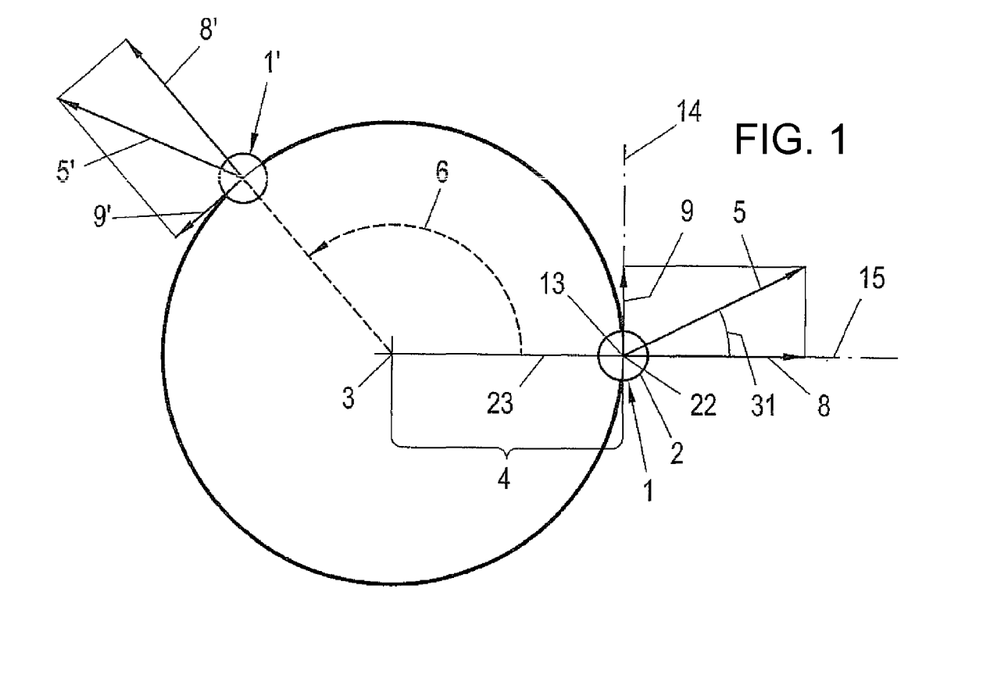
FIG. 1 shows a diagrammatic view of the kinematics.

FIG. 1 shows a diagrammatic view of the kinematics in order to discuss the method according to the invention and the device according to the invention. The plane of the representation corresponds to the horizontal plane and the direction of the force due to gravity runs projecting. Person 1 is rotated at a distance 4 around a main axis 3. In the first place, it is assumed that person 1, in particular the person's head 2, is connected rigidly to motion device 23. This means that person 1, when rotated around main axis 3, also experiences a rotation around a body axis of the person that runs parallel to main axis 3. When the person is rotated around main axis 3 through an angle 6, the person experiences a rotation around a body axis, parallel to main axis 3, through the same angle in the same direction. As a result of the rotation of person 1 at a distance 4 with respect to the main axis 3, at least one radial acceleration 8 acts on person 1. In the case of a non-uniform angular velocity around main axis 3, there is in addition a tangential acceleration 9. The direction of the tangential acceleration runs tangential to the curve of motion of the person. The orientation of the tangential acceleration is dependent on whether the change in the angular velocity corresponds to an acceleration or a deceleration.

Main acceleration 5 acting on the person in the main rotational plane 26 corresponds to the vector addition of the radial acceleration and the tangential acceleration. Depending on the position of the person, a first equilibrium plane 10, a second equilibrium plane 11 and a third equilibrium plane 12 as well as a first equilibrium axis 13, a second equilibrium axis 14 and a third equilibrium axis 15 are defined.

Furthermore, a second position of person 1' is shown, in which main acceleration 5', radial acceleration 8' and tangential acceleration 9' act.

Figure 2:
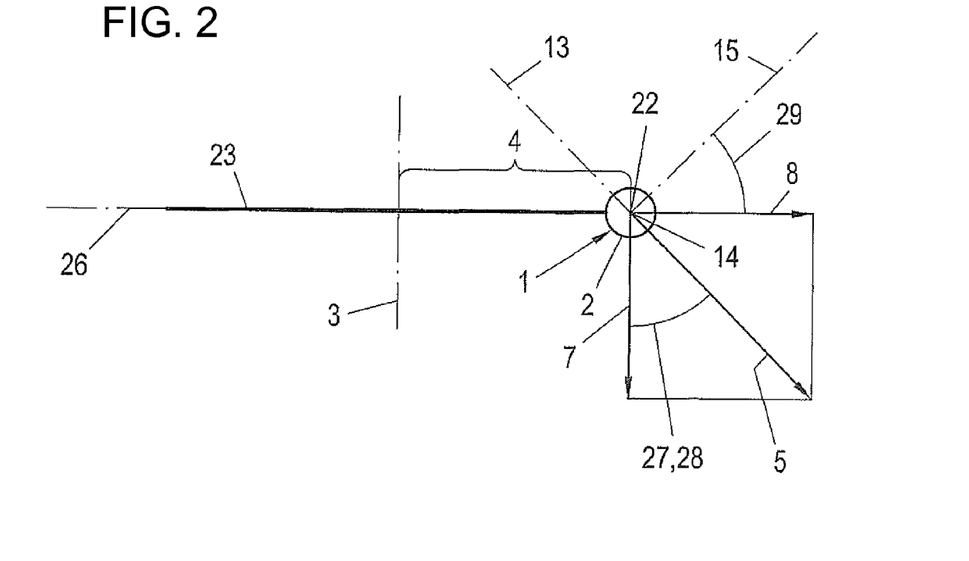
FIG. 2 shows the same kinematic arrangement as FIG. 1, but in a side view.

FIG. 2 shows the same kinematic arrangement as FIG. 1, but in a side view, so that main rotational plane 26 runs projecting and main axis 3 lies in the plane of the figure. Person 1 is again rotated at a distance 4 around main axis 3. According to the device according to the invention, this rotation takes place essentially by means of motion device 23. Radial acceleration 8 as well as gravitational acceleration 7 act in the plane of the representation on person 1, in particular on the person's head 2. The radial acceleration is dependent on distance 4 and the angular velocity of the rotation of person 1 around the main axis. The gravitational acceleration can be assumed to be constant with systems at rest. Resultant main acceleration 5 in the considered radial plane arises through the vector addition of radial acceleration 8 and gravitational acceleration 7. Radial acceleration 8 thus changes when there is a change in the angular velocity or distance 4. Since gravitational acceleration 7 is assumed to be constant, the value and the direction of main acceleration 5 change when there is a change in the radial acceleration. Overall, main acceleration 5 is thus dependent at least on radial acceleration 8, tangential acceleration 9 and gravitational acceleration 7. In the present representation, the position of person 1 is selected such that first equilibrium axis 13 coincides with the direction of main acceleration 5. The main acceleration thus acts in the yaw axis and is perceived subjectively as a vertical acceleration, wherein the tangential acceleration is initially assumed as not being present.

If the value of main acceleration 5 is changed, but the position of person 1 with respect to the changing direction of changing main acceleration 5 remains unchanged, the position of person 1 must be adapted to the direction of main acceleration 5. If this adaptation is not carried out, person 1 experiences a primary faulty force. This results from the fact that, when the value of main acceleration 5 is changed, the direction of the main acceleration also changes. The adaptation of the position of person 1, or more precisely of head 2 of person 1, takes place by a rotation of the person around at least one of secondary axes 19, 20, 21.

By means of a rotation of the person, for example around second equilibrium axis 14, the position of the semicircular channels of person 1 changes with respect to main rotational plane 26. As mentioned, the person and therefore also the person's organs of equilibrium rotate, in the presence of a rotation around main axis 3, also around a body axis of the person, which runs parallel to the main axis. After a short adaptation phase, however, this rotation around the body axis is no longer perceived by person 1, since the velocity of the fluid adapts to the motion of the semicircular channels as a result of friction and viscosity effects. The fluid is thus at rest relative to the semicircular channels, so that no rotation can be perceived. If the position of equilibrium planes 10, 11, 12 is changed relative to main axis 3 or relative to main rotational plane 26, the effect of this is that different semicircular channels become tilted towards main rotational plane 26 or away from the main rotational plane. As a result of the tilting, a spin-related angular acceleration and a relative movement of the fluid in the semicircular channels occur, which is wrongly perceived by the person as a motion. This effect produces a secondary faulty force and is referred to as a spin error. Although the person possibly performs only small movements around the third equilibrium axis, i.e. the roll axis, this can be interpreted by the organs of equilibrium as a rotation around at least one of the two remaining equilibrium axes. This sensory stimulus, i.e. the spin error, can in some circumstances trigger a vestibulo-ocular reflex. Even if the surroundings to be simulated are supported by clear visual displays, which are intended to clarify the sensory impression for person 1, the latter is no longer able to perceive the visual sensory impression after the onset of an eye flickering reflex. An undesired disorientation of the person is the result. Depending on the person's stimulation threshold, secondary faulty forces and/or spin errors are perceived at different values. If the value of the secondary faulty forces or the spin error remains below the stimulation threshold of the person, the faulty forces are not perceived, but if the value exceeds the stimulation threshold, it is perceived and can trigger a vestibulo-ocular reflex.

FIG. 2 further shows first angle 27 between the direction of main acceleration 5 and the direction of gravitational acceleration 7. The shown acceleration ratios roughly correspond to a radial acceleration which is essentially of the same magnitude as the gravitational acceleration. The direction of main acceleration 5, in particular first angle 27, is therefore approx. 45°. With a gravitational acceleration of one G and a radial acceleration of one G, the value of the main acceleration corresponds approximately to 1.41 times gravitational acceleration, i.e. 1.41 G. If the angular velocity of person 1 around main axis 3 is increased, radial acceleration 8 increases. The angle of the direction of the main acceleration with respect to the direction of gravitational acceleration 7 also increases. The radial acceleration diminishes with a reduction in the angular velocity. In this case, the angle diminishes.

In particular, FIG. 1 represents the situation in which person 1 is decelerated from a first angular velocity to a second angular velocity. Apart from the gravitational acceleration, which runs projecting in the representation of FIG. 1, and a radial acceleration 8, a tangential acceleration 9 also occurs. Resultant main acceleration 5 has a tangential angle 31. The value of tangential angle 31 is essentially zero with a constant angular velocity.

The angular deceleration represented in FIG. 1 has an influence on the direction of main acceleration 5 acting on person 1. For example, the person can be positioned with a direction of vision outwards, that is to say that the third equilibrium axis of the person or the direction of vision of the person points in a direction which is directed away from main axis 3, but does not necessarily run radially outwards. If the value of main acceleration 5 acting on the person is changed, without the direction in which the main acceleration acts on the person being changed, the person can for example be rotated around the body axis that runs parallel to main axis 3. In the represented arrangement of FIG. 1, a person viewing radially outwards would, at represented tangential acceleration 9, have to be rotated through tangential angle 31 in order to compensate for tangential acceleration 9.

Figure 3:
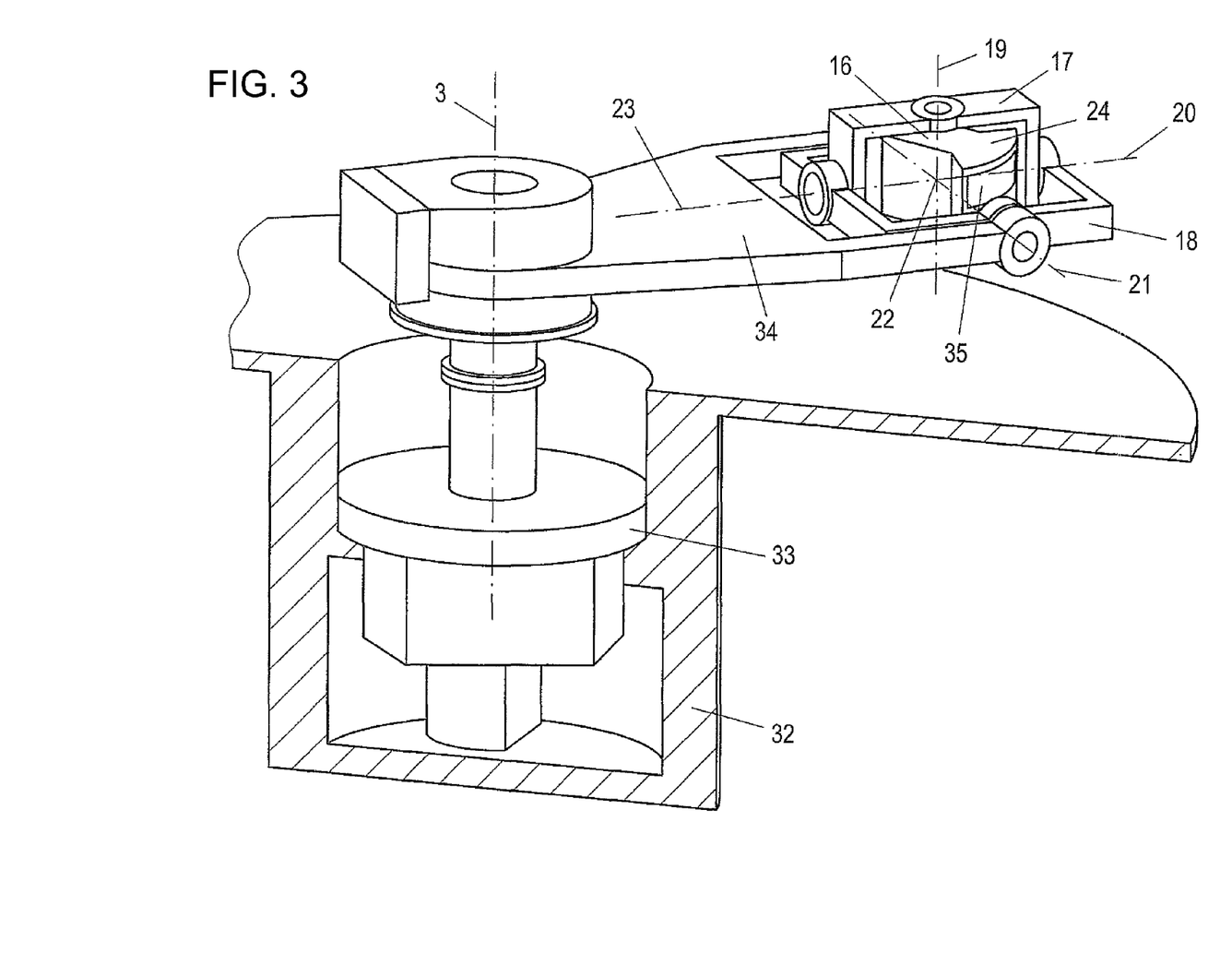
FIG. 3 shows a device according to the invention.

FIG. 3 shows a device according to the invention, wherein motion device 23 is constituted as a one-arm centrifuge. The latter comprises a main arm 34, which is driven by means of a main drive 33 mounted in a base 32. Main arm 34 can be rotated around main axis 3. A third support element 18 rotatable around a third secondary axis 21 is disposed at a distance from main axis 3 on the main arm. A second support element 17 is disposed rotatably around a second secondary axis 20 on the third support element. The second and the third secondary axes are essentially orthogonal to one another and intersect in centre 22. First support element 16 is disposed rotatably around a first secondary axis 19 on the second support element. The first and second secondary axes are also essentially orthogonal to one another and intersect in centre 22. First support element 16 is constituted in the following embodiment as part of cabin 24. The retention device for person 1 is provided in cabin 24. The retention device is preferably constituted as a seat. Furthermore, the cabin comprises in its interior an image reproduction area 35, which is represented diagrammatically as a rectangular curved area. This is a diagrammatic representation. The image reproduction area is provided on the inner side of the cabin and therefore cannot usually be seen from the exterior. The person, who in the following embodiment is connected essentially rigidly to cabin 24, can be moved rotatably through three degrees of freedom via first secondary axis 19, second secondary axis 20 and third secondary axis 21. Through the provision of a third degree of freedom, secondary faulty forces can be at least partially compensated for and/or reduced. The third degree of freedom corresponds, for example, to the rotation around a body axis which runs parallel to main axis 3 and corresponds to a rotation around the first equilibrium axis of the person.

The rotation of the person around secondary axes 19, 20, 21 takes place by means of drives of support elements 16, 17, 18. The drives enable the rotations around the secondary axes and are controlled and/or actively regulated by a control unit. The rotation of the motion device around main axis 3 by means of main drive 33 can also be controlled and/or actively regulated by the control unit. Furthermore, the person can influence the control via parameter input means, in particular can steer the simulated object in the virtual world.

Figure 4:
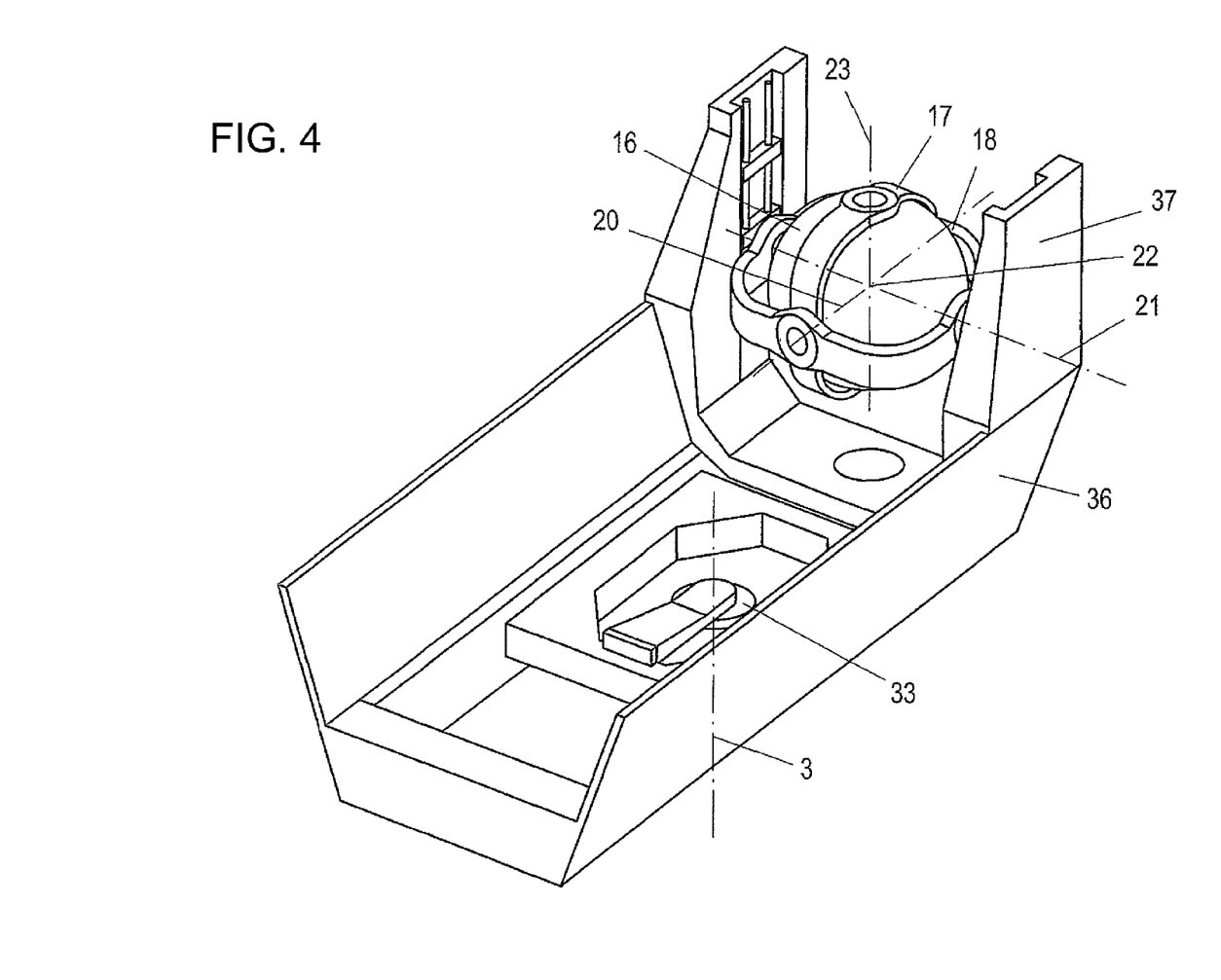
FIG. 4 shows a further embodiment of a device according to the invention.

FIG. 4 shows a further embodiment of a motion device according to the invention. A carriage basket 36 is mounted rotatably around a main axis 3, which can be driven by a main drive 33. A heave carriage 37 is provided longitudinally traversable in carriage basket 36. A third support element 18 is in turn provided on heave carriage 37, said third support element being rotatable around a third secondary axis 21. A second support element 17 is provided so as to be rotatable around a second secondary axis 20 on third support element 18. A first support element 16 is provided so as to be rotatable around a first secondary axis on second support element 17. Person 1 is connected by means of a fastening device to this first support element. In addition to the three secondary axes, the person can be moved in a translatory manner along a heave axis running parallel to main axis 3. By means of the displaceable arrangement on heave carriage 37 on carriage basket 36, distance 4 from the person and from centre 22 to main axis 3 can be changed. A change in the radial acceleration is thus also possible by changing the distance of the person from main axis 3, in addition to the change by means of the angular velocity. The retention device for person 1 again has three degrees of freedom. In addition to the three degrees of freedom, the person can be moved in a translatory manner along a direction parallel to main axis 3, and along carriage basket 36. Together with the rotation around main axis 3, the kinematic arrangement according to FIG. 4 thus offers six degrees of freedom.

Different motion sequences can be provided to compensate for and/or reduce the secondary faulty forces in simulations.

Figure 5:
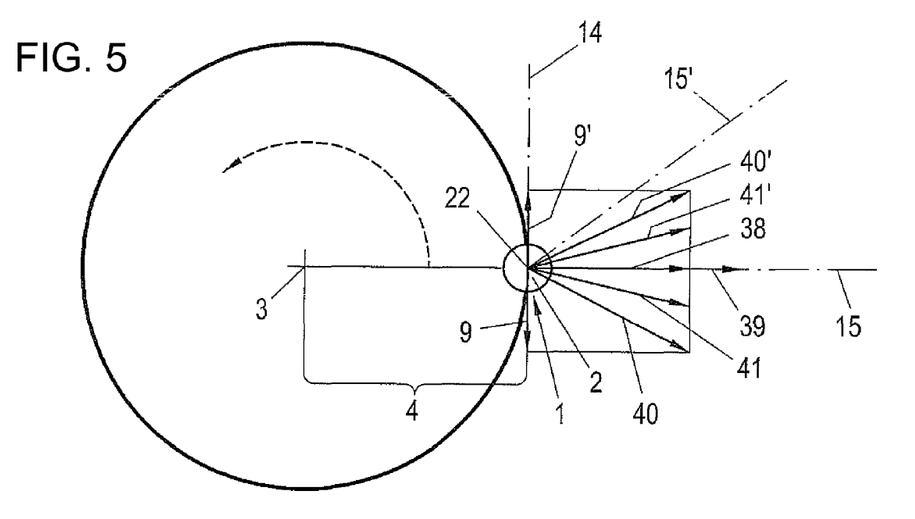
FIG. 5 shows a diagrammatic plan view to describe the kinematic ratios with changing angular velocities.

FIG. 5 shows a diagrammatic view in order to describe the kinematic ratios with changing angular velocities. Person 1 is rotated at a distance 4 around main axis 3, wherein the angular velocity is varied to generate different main accelerations. For example, to simulate a change in velocity or a turning flight of an aircraft, the person can be loaded initially with a first main acceleration 38 and then with a second main acceleration 39. For this purpose, the angular acceleration is increased from a first angular acceleration to a second angular acceleration. At the start of the simulation, motion device 23 rotates person 1 at a constant first angular velocity. Resultant first main acceleration 38 acts in a radial plane on the person. If the angular velocity is increased, a tangential acceleration 9 also acts on the person, in addition to the radial acceleration. This results in a change in the direction of the main acceleration and runs for example, in the diagrammatic representation, along acceleration vector 40. When the second angular velocity is reached, the person rotates uniformly around main axis 3 at the second angular velocity. The tangential acceleration is again equal to zero and second main acceleration 39 acts on the person, said second main acceleration being greater in the case of an increase in the angular velocity than the value of first main acceleration 38.

Tangential acceleration 9' and resultant acceleration vector 40' act when there is a reduction in the angular velocity.

Figure 6:
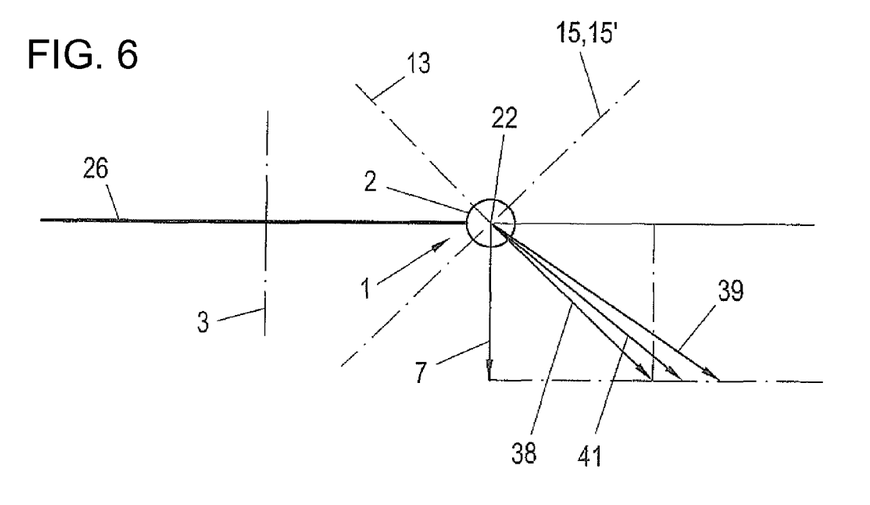
FIG. 6 shows the same kinematic arrangement as FIG. 5, but in a side view.

FIG. 6 shows the same kinematic arrangement of a person 1, who is rotated around a main rotational axis 3. The person is again accelerated from a first angular velocity to a second angular velocity. First main acceleration 38 acts with uniform motion of the person at the first angular velocity. If the person moves around main axis 3 at the second angular velocity, the second angular velocity being greater than the first angular velocity, second main acceleration 39 acts on the person. The value of second main acceleration 39 is greater than the value of first main acceleration 38. The position of person 1 can be changed to compensate for the change in the direction of the main acceleration when the value is changed. A motion around secondary axes 19, 20, 21 is provided for the change in the person's position.

In an example of a method for simulating accelerations, the person is brought from a first main acceleration to a second main acceleration. In the first example, the main acceleration is intended to act along of the body axis of the person or along first equilibrium axis 13 of the person. In a first step, the person is rotated constantly at the first angular velocity around main axis 3. First main acceleration 38 acts on the person. In order to make the direction of the acceleration coincide with first equilibrium axis 13, the person's position is changed by rotation around the secondary axes. For example, the person's position can be orientated in such a way that first equilibrium axis 13 coincides with the vector of first main acceleration 38, with the vector of second main acceleration 39 or an intermediate position 41 between the vectors. Third equilibrium axis 15 of person 1 points essentially outwards. With a constant angular velocity, therefore, it essentially follows the radial plane of the main acceleration. When the person is accelerated from the first angular velocity to the second angular velocity, the person is inclined backwards around second equilibrium axis 14 in order to adapt the person's position. However, this inclination takes place in such a way that the motion, in particular the secondary faulty forces resulting from the motion, lie in the region of or below the stimulation threshold of the person. The compensation of the primary faulty forces also takes place to an extent such that the faulty forces lie in the region of or below the stimulation threshold of the person. This can be achieved, for example, by the fact that the person is not moved around the second equilibrium axis during an acceleration from the first angular velocity to a second angular velocity. First equilibrium axis 13 is disposed running along an intermediate position 41. The person feels a slight inclination backwards when said person is rotated at a first angular velocity. A slight inclination forwards in the case of the second angular velocity. However, this feeling is so small compared to the other forces acting that it lies in the region of or below the stimulation threshold of the person. This thus compensates for the effect that, as a result of an inclination of the person around an axis that is not parallel to main axis 3, the spin of the main rotation is transferred to different semicircular channels. The spin error is thus completely compensated for with fixed positioning of first equilibrium axis 13 around second equilibrium axis 14. The secondary errors thus arising are negligible and/or lie below or in the region of the stimulation threshold.

A further possibility for positioning the person with increasing acceleration and increasing angular velocity is the orientation of the third equilibrium axis along axis 15'. The component of the person's direction of vision in the main rotational plane is directed outwards along axis 15' at a certain angle between the tangential and the radial direction. The angle can for example be rotated between 30° and 60° or 45° or from the radial direction in the direction of the tangential direction. To simulate an acceleration along first equilibrium axis 13, the latter is made to coincide with main acceleration 5. The positional change again takes place by means of a rotation of the person around secondary axes 19, 20, 21. With an increase in the angular velocity from a first angular velocity to a second angular velocity, the person's position is adapted to compensate for the primary faulty forces. The first equilibrium axis is adapted to changing main acceleration 38, 39 for this purpose. Through the inclined position of the person by an angle along axis 15', the spin error is split up over several, at least two, preferably three equilibrium planes or semicircular channels. The effect of this is then that the motion of the person around an axis that does not run parallel to main axis 3 lies in the region of or below the stimulation threshold of the person. In an embodiment of the method according to the invention, provision is made such that the stimulation threshold is fallen below in all equilibrium planes or semicircular channels of the person. For this purpose, primary faulty forces and/or secondary faulty forces can increase in one equilibrium plane or a semicircular channel, in order to keep primary faulty forces and/or secondary faulty forces in another equilibrium plane or another semicircular channel in the region of or below the stimulation threshold.

A further possibility for positioning the person is that the person is rotated with the direction of vision inwards.

Once again, main acceleration 5 should act along a body axis, for example along first equilibrium axis 13 of person 1. At a first angular velocity, third equilibrium axis 15 of the person is directed essentially inwards and inclined downwards. First equilibrium axis 13 is essentially orthogonal to third equilibrium axis 15, i.e. it is inclined outwards and runs along the direction of the main acceleration. The subjective perception of an acceleration in the direction of the body axis thus arises for the person. If the person is accelerated from the first angular velocity to a second angular velocity, the change in the direction of main acceleration 5 can, as in the preceding examples, be compensated for by rotating the person around the secondary axes. This however being to an extent such that the angular accelerations, in particular the primary and secondary faulty forces, lie in the region of or below the stimulation threshold of the person. In order to reduce the spin error, the first equilibrium axis of the person can be positioned in an intermediate position between first main acceleration vector 38 and second main acceleration vector 39.

A further application of the method according to the invention is the deceleration from a first angular velocity to a second angular velocity, wherein the second angular velocity is less than the first angular velocity. Especially in the case of the reduction of main acceleration 5, the spin errors are subjectively perceived more intensely by person 1. The person is positioned, for example, with a view outwards, first equilibrium axis 13 again corresponding essentially to the direction of the main acceleration. In order to compensate for the primary faulty forces, the third equilibrium axis can be made to coincide with the change in the direction of main acceleration 5, in particular of first main acceleration 38 and second main acceleration 39. For further compensation according to the invention, the first equilibrium axis of the person can be positioned in an intermediate position 41 between the direction of first main acceleration 38 and second main acceleration 39. A compensation of the change in the direction of the main acceleration in a radial plane is not thereby carried out. The spin error is thus reduced, as described in the preceding examples. The reduction in the spin error produces an increase in the primary faulty forces, but preferably below or in the region of the stimulation threshold of the person.

A further embodiment of the method according to the invention is characterised in that the person is rotated around a main axis 3 at an angular velocity. The direction with which the main acceleration acts on the person is determined by rotating and positioning the person around the secondary axes. According to an embodiment, the person is accelerated around the main axis from a first angular velocity to a second angular velocity, wherein the value of the main acceleration thus increases and the direction of the main acceleration is changed. The second angular velocity is greater than the first angular velocity, as a result of which the value of the second main acceleration is greater than the value of the first main acceleration. The angular velocity is then reduced to a third angular velocity, which is less than the second angular velocity. For this purpose, the primary and the secondary faulty forces are compensated for, partially compensated for and/or compensated for in such a way that they lie in the region of or below the stimulation threshold.

According to a further embodiment of the method according to the invention, the person is initially positioned, during an increase of the angular velocity from the first angular velocity to the second angular velocity, essentially tangentially, i.e. the third equilibrium axis essentially points in a tangential direction or runs in a tangential plane. Once the second angular velocity is reached, the person, in particular third equilibrium axis 15 of the person, is directed outwards. This rotation of the person through a certain angle, in particular 90°, takes place in such a way that it is not perceived and/or lies in the region of or below the stimulation threshold of the person. This motion can be controlled or actively regulated. The angular velocity is then reduced from the second angular velocity to the third angular velocity. During the increase in the angular velocity from the first angular velocity to the second angular velocity, the primary faulty forces are essentially compensated for by rotation of the person around the third equilibrium axis and around the second equilibrium axis. During the reduction of the angular velocity from the second to the third angular velocity, the primary faulty forces are compensated for in particular by rotation of the person around the first equilibrium axis and around the second equilibrium axis. The primary and the secondary faulty forces are thereby compensated for or reduced, so that they lie in the region of or below the stimulation threshold of the person.

According to a further embodiment of the method according to the invention, the person is initially orientated in a tangential direction and, to increase the first angular velocity to the second angular velocity, is rotated from the tangential orientation of the third equilibrium axis around the second equilibrium axis. This rotation can be regulated actively, in order to keep the rotation of the person in the region of or below the stimulation threshold.

According to a further embodiment, the person, in particular the third equilibrium axis of the person, is orientated essentially tangential. With the increase from the first angular velocity to the second angular velocity, the primary and the secondary faulty forces are compensated for at least partially by rotation of the person around the secondary axes. In order to reduce the angular velocity from the second angular velocity to the third angular velocity, the person is orientated looking inwards. The third equilibrium axis of the person thus points inwards, against the radial component of the main acceleration. The orientation of the person does not have to take place exactly radially, but can also be fixed at an angle between the tangential and the radial direction or can be moved in an actively regulated manner.

According to a further embodiment of the method according to the invention, the person is decelerated from a second angular velocity to a third angular velocity. The third angular velocity is again less than the second angular velocity. The person, in particular the third equilibrium axis of the person, is positioned essentially radially inwards. The axis is inclined downwards out of main rotational plane 26, so that for example the main acceleration runs in the direction of first equilibrium axis 13 of person 1.

According to a further embodiment of the invention, provision is made such that the person's organs of equilibrium comprise semicircular channels and that, in order to reduce the primary faulty forces and/or the secondary faulty forces of a semicircular channel, the primary faulty forces and/or the secondary faulty forces of a further semicircular channel are increased, and that the secondary faulty forces lie below or in the region of the stimulation threshold of the person.

The device according to the invention for performing the method is characterised, for example, in that the secondary axes run through a centre which is located in the region of head 2 of person 1. The person is positioned in the cabin in such a way that the head is located in the region of the centre.

According to an embodiment, the three axes intersect in the region of the centre.

According to a further embodiment, at least one of the secondary axes has a normal distance from the other secondary axes. This distance can for example amount to the distance between an organ of equilibrium and the eye of the person.

According to a further embodiment of the method, provision is made such that, in order to simulate a changing acceleration along a body axis of the person,
  the person is rotated at a constant first angular velocity around the main axis, at which the direction of the first main acceleration forms a first angle with respect to the direction of the gravitational acceleration,
  the person is then accelerated or decelerated to a second angular velocity, at which the direction of the second main acceleration forms a second angle with respect to the direction of the gravitational acceleration,
  that the third equilibrium axis of the person is rotated into or is in a direction diverging from the tangential plane,
  and that the body axis of the person is rotated into an intermediate position between the direction of the first main acceleration and the direction of the second main acceleration and/or into the region of the first main acceleration or into the region of the second main acceleration,
and/or that the angle between the body axis and the gravitational acceleration lies between the first angle and the second angle.

According to a further embodiment of the method, provision is made such that the third equilibrium axis of the person lies essentially in a plane between the tangential plane and the radial plane with a constant and/or changing angular velocity of the main drive, wherein the intersecting line of the tangential plane with the radial plane lies in the plane.

Drives are provided for driving the rotation around main axis 3 and for driving the rotation of person 1 around first secondary axis 19, secondary axis 20 and/or secondary axis 21. These drives are controlled and/or actively regulated. The motion of person 1 can thus be controlled and/or actively regulated. The regulation can be characterised in that control signals are conveyed to the control of the drives, wherein the drives for rotating the person are controlled and/or regulated and/or wherein the motion of the person lies below the stimulation threshold of the person.

According to an embodiment of the method according to the invention, a person is brought from a first angular velocity to a second angular velocity, wherein a first main acceleration of approx. 3G acts at the first angular velocity and a second main acceleration of approx. 1.4G acts at the second angular velocity. Person 1 is positioned such that the third equilibrium axis points outwards and points upwards from the main rotational plane at approx. 60°. When the angular velocity is reduced from the first angular velocity to the second angular velocity, the person is rotated around secondary axes to compensate for the tangential force. In order to reduce the spin error, a rotation of the person around the second equilibrium axis is held or blocked. The compensation of the tangential acceleration takes place, for example, by rotation of the person around a body axis that runs parallel to the main axis.

The invention also relates to a device for simulating accelerations for a person on which a main acceleration acts, which is generated essentially by rotation of the person at a distance around a main axis and by gravitational acceleration, wherein the value and the direction of the main acceleration are determined at least by the gravitational acceleration, the tangential acceleration and the radial acceleration, wherein the position of the person with respect to the direction of the main acceleration is essentially determined by a rotation of the person around at least two secondary axes, wherein the secondary axes run through a centre which lies in the region of the person, wherein primary faulty forces act on the person with a change in the value and the direction of the main acceleration, said faulty forces being at least partially compensated for by rotation of the person around the secondary axes, wherein secondary faulty forces act on the person due to the rotation of the person around the secondary axes and wherein the secondary faulty forces are reduced by rotating and positioning of the person.

In principle, the direction of main acceleration 5 acting on the person can be freely selected along an arbitrary body axis by rotating person 1 around the three secondary axes. In the preceding examples, first equilibrium axis 13 or the yaw axis, for example, was selected as body axes. In the case of simulations of objects in which the person is positioned lying for example, a body axis running obliquely through the body of the person can also be selected as the desired direction of the main acceleration. However, the basic kinematic arrangement and the method for compensating for the secondary faulty forces remain unchanged, only the position of the person is changed.

It should be noted at this point that the invention is not limited to the mentioned examples of embodiment. Further embodiments corresponding to the idea of the invention also arise from combinations of individual or several features which can be derived from the description as a whole, the figures and/or the claims. Thus, embodiments are also disclosed that comprise combinations of features originating from different examples of embodiment. The figures are at least in part diagrammatic representations, wherein the dimensions and proportions may diverge from other embodiments or features not depicted in drawings and from real embodiments.

1. person
2. head
3. main axis
4. distance from the main rotational axis
5. main acceleration
6. rotational angle
7. gravitational acceleration
8. radial acceleration
9. tangential acceleration
10. first equilibrium plane—yaw plane
11. second equilibrium plane—pitch plane
12. third equilibrium plane—roll plane
13. first equilibrium axis or yaw axis
14. second equilibrium axis or pitch axis
15. third equilibrium axis or roll axis.
16. first support element
17. second support element
18. third support element
19. first secondary axis
20. second secondary axis
21. third secondary axis
22. centre
23. motion device
24. cabin
25. control unit
26. main rotational plane
27. first angle
28. second angle
29. positional angle of the third equilibrium axis
30. positional angle of the first equilibrium axis
31. tangential angle
32. base
33. main drive
34. main arm
35. image reproduction area
36. carriage basket
37. heave carriage
38. first main acceleration
39. second main acceleration
40. acceleration vector
41. intermediate position

The invention claimed is:
1. A method for simulating accelerations for a person, the method comprising:
rotating the person at a distance around a main axis by driving a main arm of a motion device with a main drive such that a main acceleration acting on the person is substantially generated by the rotation of the person and by a gravitational acceleration, wherein a magnitude and a direction of the main acceleration is determined by the gravitational acceleration, a tangential acceleration and a radial acceleration, and wherein primary faulty forces act on the person when there is a change in the magnitude and the direction of the main acceleration;
at least partially compensating for the primary faulty forces and substantially determining a position of the person with respect to the direction of the main acceleration by rotating and/or positioning the person around a plurality of secondary axes by driving a plurality of support elements with a plurality of drives, the secondary axes running through a center lying in a region of the person, wherein secondary faulty forces act on the person due to the rotation of the person around the secondary axes, and wherein the plurality of support elements includes three support elements, the plurality of drives includes three drives, and the plurality of secondary axes includes three secondary axis; and reducing the secondary faulty forces by rotating and positioning the person around the three secondary axes by driving the three support elements with the three drives.

2. The method according to claim 1, which comprises causing the primary faulty forces to increase in order to reduce the secondary faulty forces by driving the plurality of support elements with the plurality of drives.

3. The method according to claim 1, which comprises, in order to reduce the primary faulty forces and/or the secondary faulty forces in one equilibrium plane, increasing the primary faulty forces by driving the plurality of support elements with the plurality of drives and/or the secondary faulty forces in another equilibrium plane by driving the plurality of support elements with the plurality of drives.

4. The method according to claim 1, wherein the angular accelerations caused by the primary faulty forces and the angular accelerations caused by the secondary faulty forces lie below or in a vicinity of a stimulation threshold of the person.

5. The method according to claim 1, wherein the primary faulty forces are selected from the group consisting of main acceleration faulty forces and Coriolis faulty forces, and the secondary faulty forces are selected from the group consisting of spin errors and rotational-inertial forces.

6. The method according to claim 1, which comprises, in order to reduce the rotational-inertial forces, limiting and/or attenuating the angular acceleration and/or the gradient of the angular acceleration of a rotation of the person around the secondary axes.

7. The method according to claim 1, which comprises rotating the person around the main axis by driving the main arm with the main drive and around the secondary axes by driving the plurality of support elements with the plurality of drives, so that the angular acceleration of each semicircular channel in the respective equilibrium plane lies below a stimulation threshold of the person.

8. The method according to claim 7, wherein the stimulation threshold lies between $0.8°/s^2$ and $5°/s^2$.

9. The method according to claim 1, wherein the stimulation threshold lies between $1°/s^2$ and $3°/s^2$.

10. The method according to claim 1, which comprises, in order to simulate a changing acceleration along a body axis of the person,
rotating the person at a constant first angular velocity around the main axis, at which a direction of the first main acceleration encloses a first angle with a direction of the gravitational acceleration;
accelerating or decelerating the person to a second angular velocity, at which a direction of the second main acceleration encloses a second angle with the direction of the gravitational acceleration; and
rotating a third equilibrium axis of the person into a direction diverging from a tangential plane.

11. The method according to claim 1, which comprises, in order to simulate a changing acceleration along a body axis of the person,
rotating the person at a constant first angular velocity around the main axis, at which a direction of the first main acceleration encloses a first angle with a direction of the gravitational acceleration;
accelerating or decelerating the person to a second angular velocity, at which a direction of the second main acceleration encloses a second angle with the direction of the gravitational acceleration;
rotating a third equilibrium axis of the person into or in a direction diverging from the tangential plane; and
rotating a body axis of the person into an intermediate position between the direction of the first main acceleration and the direction of the second main acceleration and/or into the region of the first main acceleration or into the region of the second main acceleration.

12. The method according to claim 10, which comprises controlling and/or actively regulating a position of the third equilibrium axis and/or the body axis of the person between the tangential plane and the radial plane by rotation of the person around the three secondary axes by driving the three support elements with the three drives and changing or positioning the rotation of the body axes and the equilibrium axes by a positional change of the person around the secondary axes.

* * * * *